United States Patent [19]

Chang

[11] 4,036,926

[45] July 19, 1977

[54] METHOD FOR BLOW MOLDING A CONTAINER HAVING A CONCAVE BOTTOM

[75] Inventor: Long Fei Chang, Toledo, Ohio

[73] Assignee: Owens-Illinois, Inc., Toledo, Ohio

[21] Appl. No.: 587,011

[22] Filed: June 16, 1975

[51] Int. Cl.² .......................................... B29C 17/07
[52] U.S. Cl. .................................... 264/94; 264/296; 425/525; 425/526
[58] Field of Search ...................... 264/89, 90, 92, 94, 264/97, 98, 99, 296, 292, 320, 322, 313; 425/DIG. 30, DIG. 214, DIG. 233

[56] References Cited

U.S. PATENT DOCUMENTS

| | | | |
|---|---|---|---|
| 1,967,245 | 7/1934 | Hothersall | 264/292 UX |
| 2,188,365 | 1/1940 | Lent et al. | 425/DIG. 30 |
| 2,372,418 | 3/1945 | Forbes et al. | 425/DIG. 30 |
| 3,692,454 | 9/1972 | Kruger | 425/388 X |
| 3,764,644 | 10/1973 | Robinson | 264/296 X |
| 3,819,789 | 6/1974 | Parker | 264/94 |
| 3,865,530 | 2/1975 | Jesselallee et al. | 425/DIG. 216 |

*Primary Examiner*—Jan H. Silbaugh
*Attorney, Agent, or Firm*—Richard D. Heberling; E. J. Holler

[57] ABSTRACT

A method of making a concave bottom on a blown thermoplastic container. A blowable pre-form is initially expanded against a composite mold surface defined by the end faces of a plurality of concentric tubes surrounding a central actuating rod. The rod and the tubes are initially telescopically positioned to define a composite concave surface, so that a first convex bottom is blown. Subsequently, the rod and tubes are actuated telescopically to progressively invert the convex bottom to a concave shape. The end faces of the tubes may be grooved to define reinforcing ribs in the concave bottom wall, if desired.

1 Claim, 14 Drawing Figures

U.S. Patent  July 19, 1977  Sheet 1 of 5  4,036,926
FIG. 1
FIG. 2
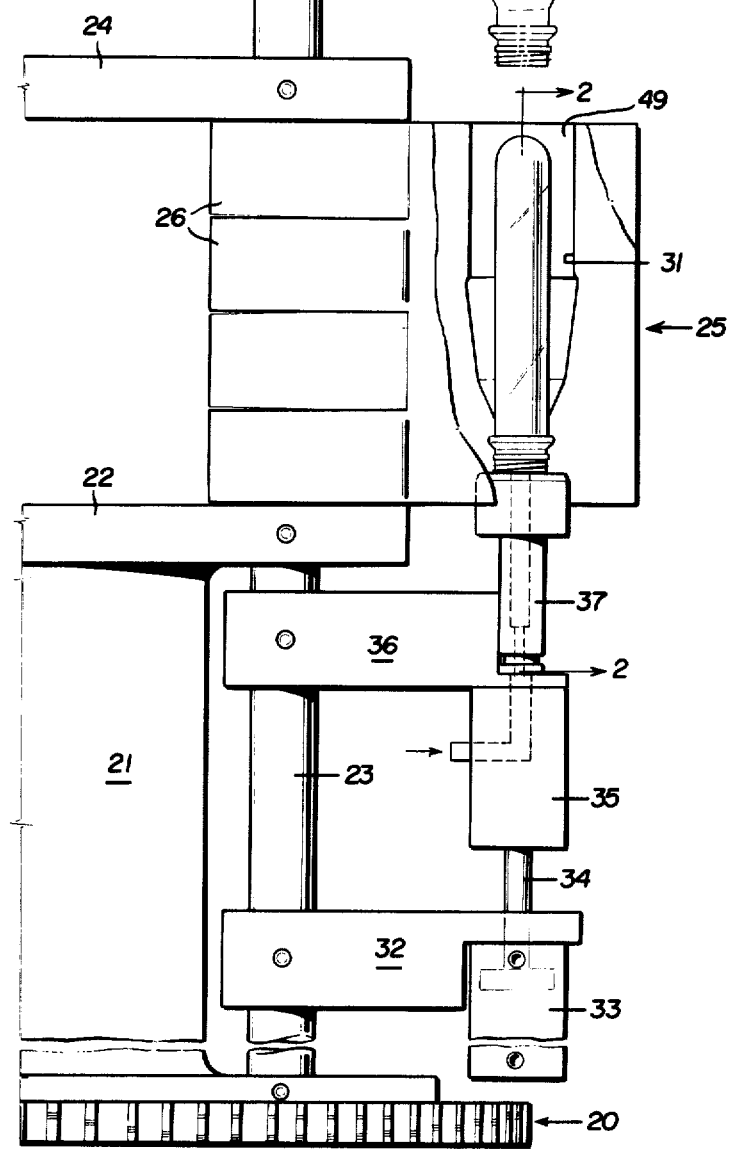
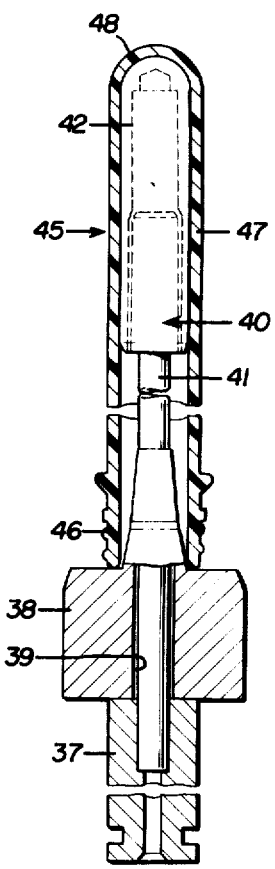

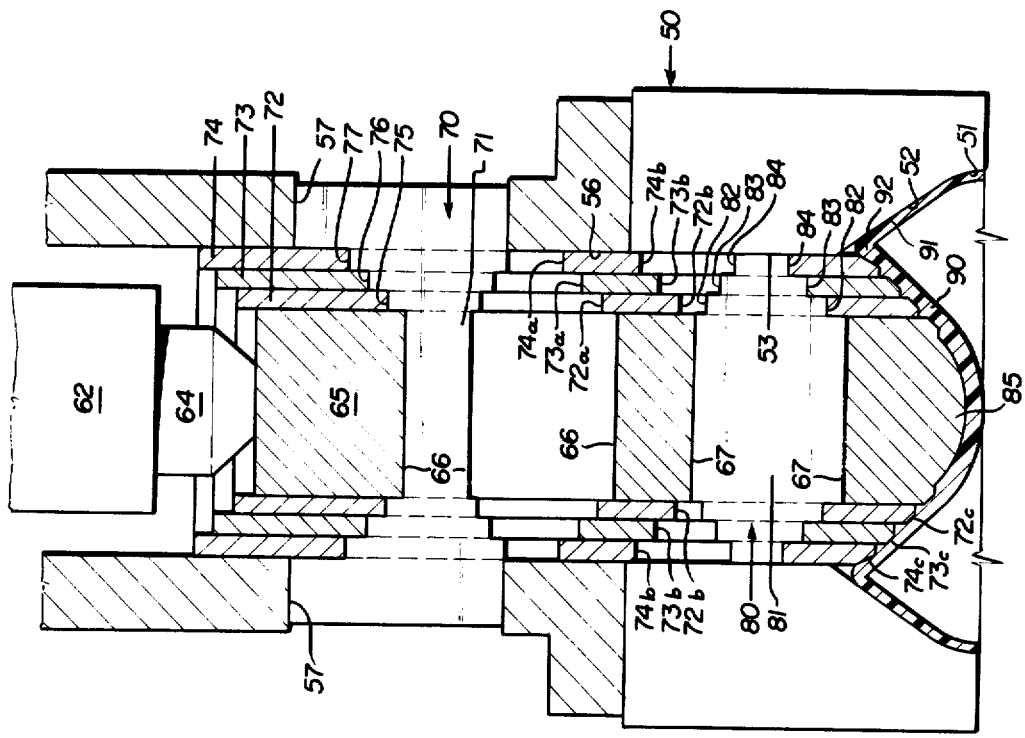
FIG. 7
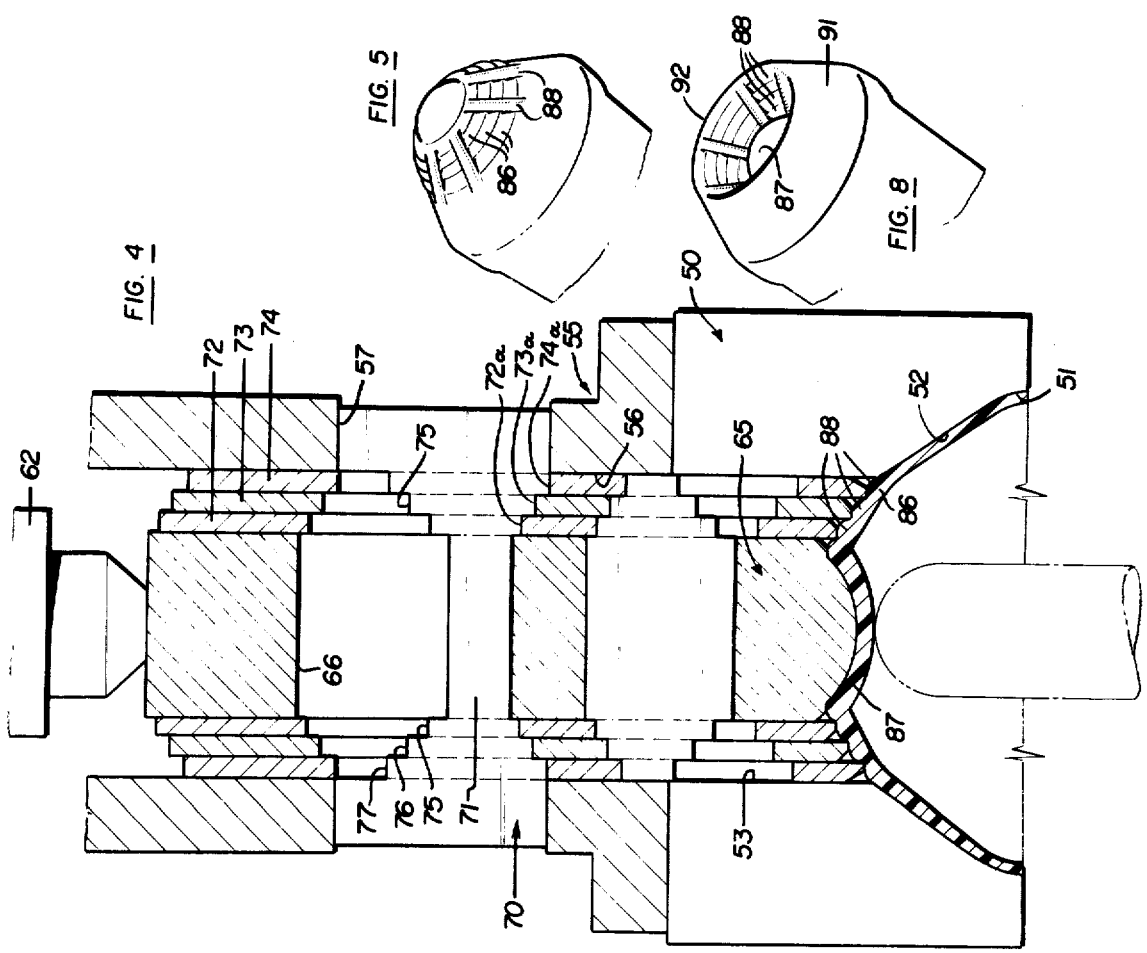
FIG. 5
FIG. 4
FIG. 8

METHOD FOR BLOW MOLDING A CONTAINER HAVING A CONCAVE BOTTOM

BACKGROUND OF THE INVENTION

This invention relates to the manufacture of bottles or containers of thermoplastic materials for the retention of fluids under pressure, such as carbonated beverages or the like. Recently, various thermoplastic materials have been developed which are capable of retaining carbon dioxide and which are blow-moldable into suitable containers. Such materials include poly (ethylene terephthalate) or PET, or nitrile based resins known as LOPAC, a registered trademark of Monsanto Company, or nitrile-group-containing monomers of the type disclosed in U.S. Pat. No. 3,873,660.

Such a bottle generally consists of a shoulder portion with a cap-receiving finish, a side wall or main body portion, and a bottom wall joined to the side wall. Pressure-retaining bottles are generally of cylindrical overall contour, but the present invention is applicable to bottles of other than cylindrical contour. For purposes of simplicity of description, such terms as "cylindrical", "annular", etc. are herein utilized, but it should be understood that these terms are merely descriptive, not limiting, in a geometric sense.

One primary problem which is encountered in blow-molding thermoplastic materials to form bottles capable of retaining $CO_2$ and other gases under pressure resides in the provision of a bottom shape capable of serving as a bottle support, while resisting deformation under pressure.

One suitable bottom shape is a simple, outwardly hemispherical shape, but this requires a separately applied, outer peripheral support to make the bottle stand upright. A less expensive, more practical shape results from the inversion of the outwardly hemispherical shape to an inwardly concave or champaign bottom shape. The transition region located at the juncture of the cylindrical bottle side wall with the inverted, concave bottom forms a seating ring upon which the bottle is supported in an upright position. Much effort has been devoted to the design of inverted, concave bottoms of this type, and many different methods and many different molds have been developed.

To reduce the creep characteristics of polymeric materials under internal pressure, the material is oriented during the bottle formation, requiring blowing at a reduced temperature. Attempts to form a concave bottom by directly inflating a parison in a blow mold of the final bottle shape have failed. Under these blowing conditions, the material simply bridges over the sharp curvatures required in the mold to form an adequate seating ring, and the material stretches and thins out in the region where the greatest strength is required. As a result, seating rings deform under internal pressure to reduce the seating ring diameter and to change the pressure-resistant characteristic of the concave bottom.

It has been proposed that an initial outwardly convex bottom be blown which is then inverted to form a final concave bottom. Those methods and apparatus heretofore proposed either (1) require the utilization of a separate inversion mold and reheating of the initial bottom or (2) simply push a convex die against the outwardly convex bottom. Neither technique has solved the problems inherent in the requirements of sharp curvatures in the transition zone and of adequate material thickness at the seating ring.

As a result, the prior art has not yet evolved a method and apparatus for forming a concave, pressure-resistant bottom for a thermoplastic container capable of retaining fluids under pressure.

SUMMARY OF THE PRESENT INVENTION

The present invention, in essence, provides novel methods for the manufacture of a novel bottom shape for a pressure-resistant thermoplastic container.

Generally, the present invention utilizes an overall blowing apparatus and method such that disclosed in Rosencrantz U.S. Pat. No. 3,599,280. In this patent, a thermoplastic parison is heat-conditioned to a desired temperature at which the parison is blowable, and the material will be oriented biaxially upon blowing at such temperature. The parison is supported on a mandrel such as that illustrated in Seifert U.S. Pat. No. 3,865,530, the mandrel being extensible during blowing to promote the orientation of the material and to accurately position the parison internally of the blow mold.

The blow molds of these earlier patents are modified to provide a mold bottom which is convertible from an initial concave shape to a final convex shape. This is accomplished by making the mold bottom as a composite of a plurality of tubular elements telescopically movable relative to one another and telescopically movable relative to a center actuating rod. The mold bottom is defined by the end faces of the concentric tubes and the rod. These end faces are are initially positioned to cooperatably define a concave shape forming an extension of the remainder of the blow mold, and the parison is inflated against this composite shape to provide a convex bottom portion on the blown parison or pre-form. After initial blowing, and while the parison contains sufficient residual heat to be readily reformable, the central rod is actuated to project into the mold, and the rod actuates, in sequence, the concentric, telescopically movable sleeves to varying extents and in the same direction. As a result, the convex bottom is inverted into a concave shape.

By actuating the bottom sections in sequence, the initial convex bottom of the blown pre-form is sequentially folded back into its final concave configuration. Further, the ends of the sleeves contour the blown bottom to define circumferential reinforcing ribs thereon. The ends of the sleeves can also be grooved, if desired, to provide radial reinforcing ribs at the exterior surface of the bottom wall.

As a result, a blown bottom is defined which has a reinforcing support ring formed at the juncture of inner and outer bottom walls, this ring being of uniform wall thickness, of reduced radius and defined between steeply inclined inner and outer walls for maximum structural rigidity.

ON THE DRAWINGS

FIG. 1 is a general assembly view, showing, in elevation, the general arrangement of an apparatus of the present invention capable of carrying out the method of the present invention;

FIG. 2 is a sectional view, with parts, shown in elevation, illustrating the support of a parison or pre-form on a mandrel;

FIG. 4 is an enlarged fragmentary sectional view taken along with plan 4—4 of FIG. 3, and illustrating the specific blow mold bottom construction of the present invention and the carrying out of an initial step of the method of the present invention;

FIG. 5 is a fragmentary perspective view of the bottom of the blown pre-form of convex shape, carried out by the apparatus and method of FIG. 4;

FIG. 7 is a view similar to FIG. 4, illustrating the final position of the apparatus and the final carrying out of the method of the present invention to reform the bottom to a concave configuration;

FIG. 8 is an elevational view, in perspective, of the container bottom after the performance of the method step of FIG. 7;

DETAILED DESCRIPTION OF THE PREFERRED EMBODIMENTS

Figure 3:
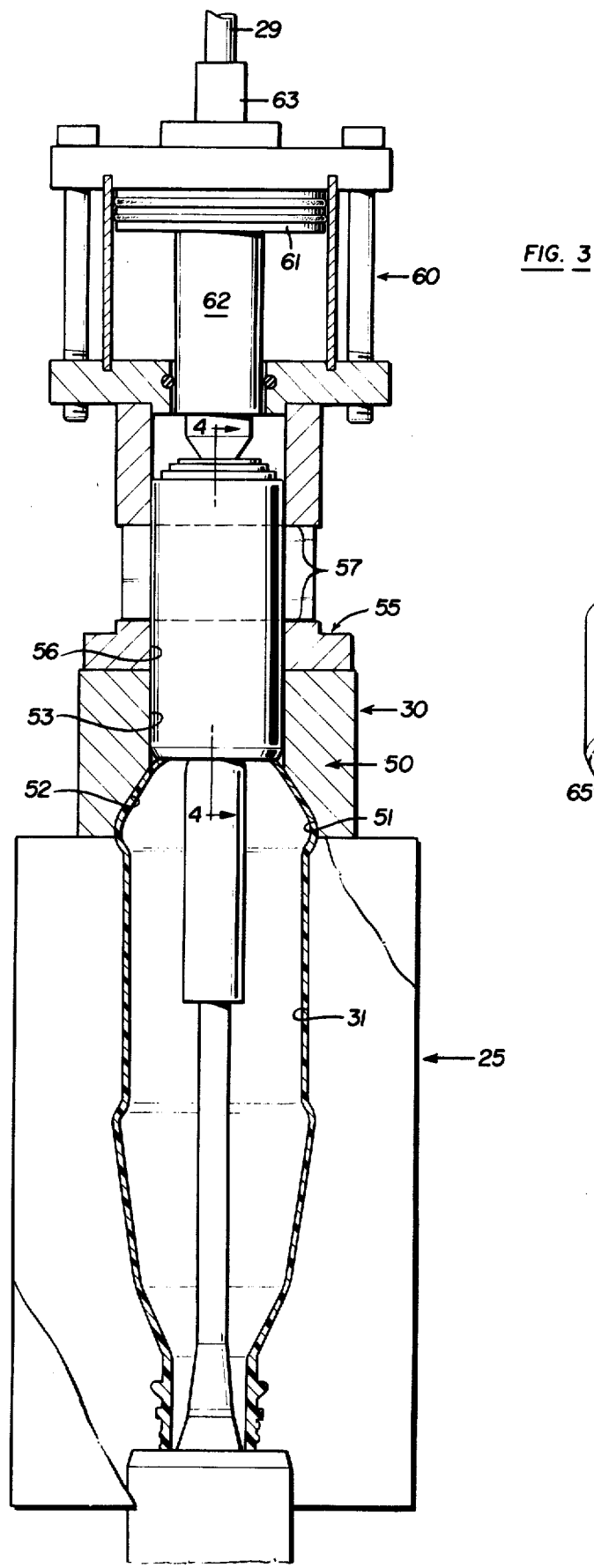
FIG. 3 is an enlarged, partial view similar to FIG. 1, illustrating in greater detail the blow mold of the present invention and the initial inflation of the pre-form in the blow mold.
Figure 6:
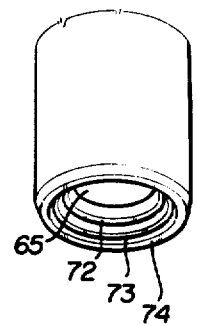
FIG. 6 is a fragmentary elevational view in perspective of the apparatus positioned as illustrated in FIG. 4.

As shown on the drawings, and specifically in FIG. 1, a blow molding apparatus of the type fully described in Patent 3,599,280 is illustrated. Reference to said U.S. Pat. No. 3,599,280 is made for full details, which need not be repeated here.

Specifically, the apparatus includes a rotary table 20 carrying a vertical post 21 surmounted by a support flange 22. The table 20 carries a plurality of vertically-extending support posts 23, only one of which is illustrated. This post 23 is supported in vertical position by the flange 22 and an upper flange 23 spaced above the flange 22. Interposed between the flanges is a blow mold indicated generally at 25.

The mold assembly 25 comprises a pair of openable and closable blow mold sections of the book-type, having interdigitated hinge sleeves 26 journalled on the vertical post 23. The mold sections are openable an closable by actuating means (not shown) described in U.S. Pat. No. 3,599,280.

The upper-free end of the post 23 carries a radial, projecting arm 27 supporting, at its outer end, a vertical actuating cylinder 28, the piston 29 of the cylinder 28 carrying a bottom mold assembly 30. This bottom mold assembly 30 is axially aligned with the open topped blow mold cavity 31 defined by the blow mold 25. A lower radial support arm 32 carries a second actuating cylinder 33 having an upwardly projecting actuating rod 34 surmounted by a blow air supply head 35. When actuated by the cylinder 33, the block 35 abuts the under surface of a second radial lower arm 36 surmounted by a mandrel support 37. Mounted on the support 37 is a mandrel block 38 having a central bore 39 through which a mandrel indicated generally at 40 projects. This mandrel 40 is vertically aligned with the mold bottom assembly 30 and with the mold cavity 31, the block 38 being clamped in position to close the lower open end of the mold cavity 31 when the mold halves are closed, with the mandrel 40 projecting axially into the mold cavity 31, as illustrated in FIGS. 1 and 3.

As explained in detail in U.S. Pat. No. 3,865,530, the mandrel 40 comprises a lower elongated tubular section 41 surmounted by a cup-shaped element 42. As air under pressure enters the mandrel through the lower tubular portion 41, the upper cup-shaped element 42 moves vertically to follow the axial expansion of the parison.

As best illustrated in FIG. 2 of the drawings, a heated, thermoplastic pre-form or parison 45 is positioned on the mandrel 40. This parison 45 includes a lower threaded neck or finish portion 46 abutting the block 38 and engaged by the mold 25 when the mold halves are closed. An upper tubular portion 47 of the parison surrounds the mandrel 40 and is surmounted by a closed, generally hemispherical parison end 48 from which the bottom of the container will be formed, as hereafter more fully described in detail. This closed end 48 of the parison is positioned in the mold cavity 31 short of the open upper end 49 of the mold cavity and in registry with the upper mold bottom assembly 30.

The mold bottom assembly 30 is best illustrated in FIGS. 3, 4, 7, 9 and 10. From FIG. 3, it will be seen that the mold bottom assembly 30 comprises a mold bottom block 50 having a lower aperture 51 which registers with the aperture 49 of the mold cavity 31. This aperture 51 is contoured to blend into a conical surface 52 which, in turn, terminates at a cylindrical bore 53 extending upwardly through the block 30. A guide sleeve 55 surmounts the block 50 and has a bore 56 forming a continuation of the bore 53. The guide sleeve 55 is radially slotted as at 57, for a purpose to be hereinafter more fully described. The guide sleeve has superimposed thereon an actuating cylinder 60 encompassing a fluid-actuated piston 61 having a piston rod 62 illustrated in FIG. 3 in its retracted position and extensible downwardly into the bore 56 of the guide sleeve 55. The cylinder 60 is provided with fluid ingress and egress means (not shown) for actuating the piston 61 between its illustrated upper retracted position and its lower, extended position.

The cylinder 60 is secured to the actuating piston rod 29 of the upper cylinder 28, heretofore described, by mounting block assembly 63. Upon actuation of the cylinder 28, the entire upper mold assembly comprising the mold block 30, the guide sleeve 55, the actuating cylinder 60 and the mounting block 63 are actuated vertically from their retracted position of FIG. 1 to their lowered, extended position of FIG. 3.

Referring now to FIG. 4 of the drawings, it will be seen that the lower end of the piston rod 62 has a reduced mounting portion 64 projecting therefrom, and this mounting projection is secured to a central rod 65 which is cylindrical in contour and which projects downwardly through the guide sleeve bore 56 to depend into the bore 53 of the bottom mold block 50. This rod 65 is provided with an upper radial slot 66 and with a lower radial slot 67. Positioned in the upper slot 66 and projecting radially through the aligned slots 57 in the guide sleeve 55 is a fixed key indicated generally at 70. The central portion of the key 70, indicated at 71, is of reduced axial extent and registers with the slot 66 in the central rod 65. The rod 65, thus, is movable axially upon actuation of the cylinder assembly 60, such movement being accommodated by movement of the key 71 in the slot 66.

Surrounding the rod 65 and telescopically interposed between the sleeve bore 56 and the rod is a series of telescopically assembled sleeves 72,73,74, each such sleeve having a radial slot 72a,73a,74a therein to receive the key 70 therethrough, the key having upper and lower stepped surfaces 75,76,77 thereon for abutting the edges of the slots 72a,73a, and 74a respectively.

A second, lower key 80 is positioned in the lower slot 67 of the rod 65. This key is provided with a central portion 81 which fits snugly within the slot 67 of the rod 65, and this key is radially sized to fit within the bore 53 of the mold block 50. Each of the sleeves 72,73,74 is provided with a second radial slot 72b,73b,74b, respectively, receiving the outer portions of the key 80 therethrough, the key 80 being provided with upper and lower stop surfaces 82,83,84 engageable with the upper and lower edges of the slots 72b,73b,74b, respectively.

The function of the key 80 is to actuate each of the sleeves 72,73,74 in sequence as the rod 65 is lowered or raised by the cylinder 60. Comparing FIGS. 4 and 7, it will be seen that lowering of the rod 65 similarly lowers the key 80. The inner sleeve 72 will be actuated downwardly when the lower slot edge 74b is contacted by the lower key abutment surface 82. Upon further movement, the sleeve 73 will be actuated downwardly by abutment between the key edge 83 and the slot edge 73b, while the same abutment between the key surface 84 and the slot edge 74b will accomplish verticaly downward displacement of the outer sleeve 74.

The function of the upper key 70 is to serve as a stop for the downward displacement of the central rod 65 and each of the sleeves 72,73,74. Downward motion of the rod 65 ceases when the slot edge 66 contacts the upper abutment surface of the central portion 71 of the key 70. At the same time and in the same manner, the key abutment edges 75,76,77 contact the upper extremities or edges of the sleeve slots 72a,73a,74a, respectively.

Thus, the lower key 80 serves to axially displace the sleeves 72,73,74 axially as a consequence of the displacement of the rod 65. The upper key 70 serves as a stop to position the rod 65 and the sleeves 72,73,74 in both of their extreme axial positions of FIG. 4 and of FIG. 5.

It will be noted that the lower end of the rod 65 in convex and slightly rounded to a partial spheroidal shape, as at 85. The ends of the sleeves 72,73,74 are chamfered out their outer peripheries, as at 72c,73c and 75c, for a purpose to be hereafter more fully described.

Turning now to the operation of that embodiment of the invention illustrated in FIGS. 3 through 8, it will be seen from FIG. 3 that the parison 45 of FIG. 2 has been blown or inflated to the shape of the mold cavity 31. The slidable sleeve 42 of the mandrel 40 is extended with the parison as it is blown. During blowing, the rod 65 and the sleeves 72,73,74 occupy their positions as illustrated in FIG. 4, i.e., with the cylinder 60 actuated to retract the piston 61, thereby positioning the rod 65 and the sleeves 72,73,74 in abuttment with the lower abuttment surfaces of the key 70.

As seen in FIG. 4, the parison is blown and expanded into contact with the conical wall 52 of the mold bottom block 50 and against the under surfaces of the retracted elements 65,72,73,74 to form a bottom 86 of overall convex configuration against the end surfaces of the sleeves 72,73,74, the center of this bottom being of slightly concave configuration, as at 87, due to its contact with the rounded lower end of the retracted rod 65. Further, it will be noted that the bottom 86, under the pressure of the blowing medium, flows into the spaced provided by the chamfered ends 72c,73c,74c of the sleeves to provide circumferential ribs 88 circumscribing the exterior surface of the convex bottom.

Immediately after the blowing step and while the heated thermoplastic blown bottom is still capable of elastic deformation, the cylinder 60 is actuated to move the piston 61, the piston rod 62, and the rod 65 downwardly. At the same time, the mandrel is retracted downwardly. When the rod 65 and the key 80 have moved sufficiently to abut the key surface 82 with the lower edge of the slot 72b, the inner sleeve 72 is moved downwardly. Further movement of the rod 65 and the key 80 successively brings the key surfaces 83 and 84 into contact with the sleeve slot edges 73b and 74b to likewise displace the sleeves 73 and 74 downwardly. This downward displacement continues until the upper edges of the slots 66,72a,73a and 74a abutt the upper abuttment surfaces 71,75,76,77 of the upper key 70. At this time, the rod 65 and the sleeve 72,73,74 have assumed their positions illustrated in FIG. 7, where the ends of the sleeves 72, 73,74 now define an overall convex configuration. The displacement of these elements displaces the initial convex bottom 86 of the container to the concave configuration illustrated in FIG. 7 and indicated by reference numeral 90.

The initial actuation of the rod 65 followed by the successive, sequencial actuation of the sleeves 72,73,74 results in the initial displacement of the center of the convex bottom 86 with the bottom being successively actuated radially outwardly from the center. As a result, the final motion of the outermost sleeve 74 folds the juncture of that portion 91 of the bottom lying against the conical surface 52 and the concave portion 90 of the bottom into a sharp annular joining portion 92 of quite small radius. This annular portion 92 constitutes the extreme axial edge of the bottle and provides an annular support ring of desirable configuration, as will be hereafter more fully explained.

The entire assembly of the rod 65, and the sleeve 72,73,74 are retained in their configuration of FIG. 7 until such time as the blown container has been cooled to a self-sustaining state. At that time, the upper cylinder 28 is actuated to retract the entire bottom mold assembly upwardly. At this time, the mold 25 may be opened and the finished bottle removed.

Figure 10:
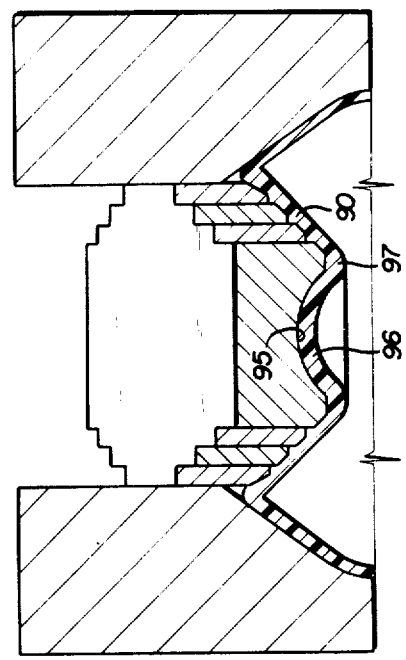
FIG. 10 is a view similar to FIG. 7, illustrating the apparatus positioned to carry out the bottom reforming step of the method.
Figure 9:
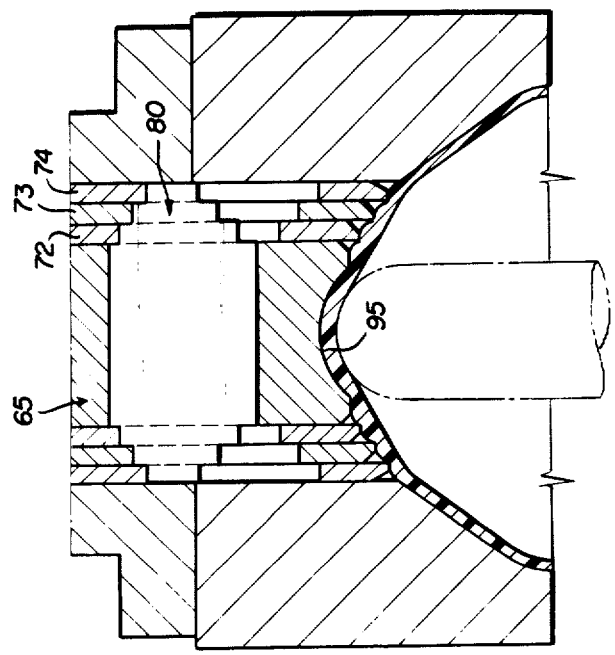
FIG. 9 is a view similar to FIG. 4, illustrating a different form of apparatus for forming a concave bottom, having an innermost convex portion.

In that embodiment of the invention illustrated in FIGS. 9 and 10, a mold bottom is formed which is of slightly different configuration. In this instance, the center rod 65 is provided with a concave free end 95 rather than the convex lower end 85 described in connection with the embodiments of FIGS. 4 and 7. The sleeves 72,73,74 are identical, as is the lower key 80. The only difference is that the final bottom wall is provided with a concave central depression or dimple 96, surrounded by an annular return portion joining the portion 96 to the concave wall 90 heretofore described. This portion 96 may have certain advantages in some applications since, it reduces the depth of the push-up of the bottom wall into the container where a large seating ring 92 is required for support stability.

It will be recalled that the blowing of the bottom wall 90 against the free, chamfered ends of the sleeve 72,73,74 created ribs 88 circumferentially of the wall 90.

Figure 12:
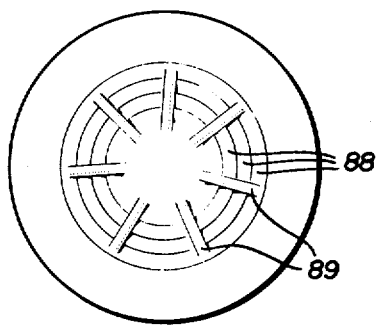
FIG. 12 is a fragmentary elevational view of a container bottom having such radial reinforcing ribs.
Figure 11:
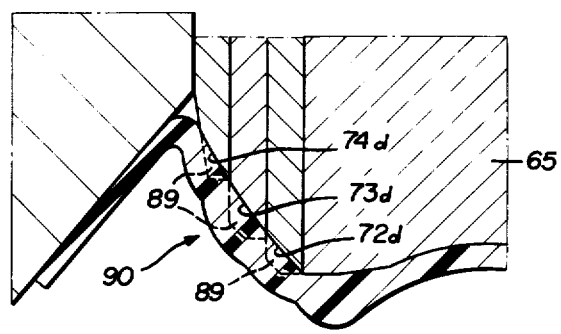
FIG. 11 is a fragmentary view, similar to FIG. 10, illustrating a method and apparatus for providing radial reinforcing ribs in the final convex bottom.

In FIGS. 11 and 12, there is illustrated another variation, wherein, the ends of the sleeves are radially slotted as at 72d, 73d, 74d to form radially extending ribs 89 of increased wall thickness, these radial ribs 89 cooperating with the peripheral ribs 89 to form a grid-type reinforcement for the bottom wall 90.

Figure 13:
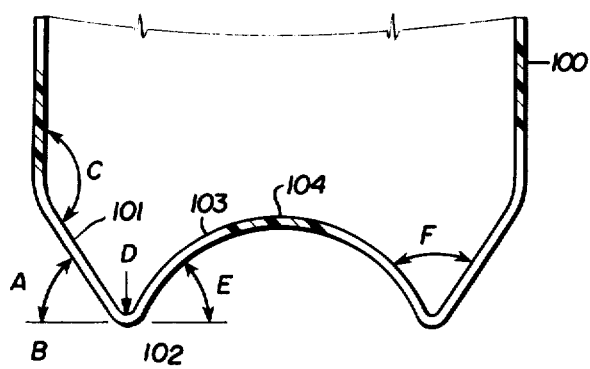
FIGS. 13 and 14 are fragmentary sectional views of two bottom configurations of containers of the present invention.
Figure 14:
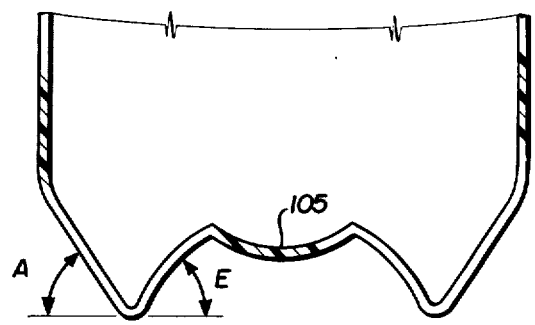

One of the primary objectives of the present invention is the provision of an improved container having a bottom wall of enhanced pressure-resistant characteristics. Such a bottom wall is specifically illustrated in FIGS. 13 and 14. The remainder of the container is quite conventional and includes a side wall 100 of cylindrical configuration or of any other desired configuration, this side wall being surmounted by a shoulder and a dispensing opening (not shown) and which can be of any desired configuration.

The specifically improved bottom, pressure wall of the present invention includes an exterior peripheral wall 101 which is preferably conical in configuration, the wall 100 terminating in a return portion 102 defining a seating ring located inwardly of the wall 100. The central portion 103 of the bottom wall is of overall concave configuration and may extend upwardly to a central concave portion 104 (FIG. 13) or may extend upwardly to a depressed convex central portion 105, as explained in conjunction with FIGS. 9 and 10 above. The compound concave-convex shape of FIGS. 9 and 10 has the advantage of not reducing the capacity of the container, and so is preferred in some instances.

The conical wall 101 may be defined as having a slope angle A with respect to the horizontal B of 45° or better. Alternatively, the slope angle of the wall 101 may be defined with reference to the side wall 100 of the container, and this included angle C is at least 135°. The relatively great steepness of the slope angle A increases the rigidity of this wall against bending under the pressure generated internally of the container. The lower side wall 101 need not be conical but the radius should be as great as possible so as to approach a conical configuration.

The seating ring region 102 has a radius of curvature which is as small as possible. This radius of curvature may be defined as the ratio of the radius of curvature D to the wall thickness of the container bottom, and this ratio should be as small as possible and preferably less than four. In other words, the radius of curvature of the portion 102 is not more than four times the average wall thickness of the container bottom.

The slope angle E of the concave portion 103 is also as great as possible to enhance bending resistance in this region. Again, a slope angle of at least 45° is preferred. Finally, the included angle F between the slope angle of the outer wall 101 and the slope angle of the inner wall 103 is preferably less than 90°, again, to increase the bending resistance.

I claim:

1. In a method of blow molding a plastic container having one concave wall from a thermoplastic material, by the inflation of a thermoplastic parison interiorly of a blow mold into a blown pre-form having the overall configuration and size of the final container with the exception of the configuration of said one wall, the one wall of the pre-form being generally convex and protruding from the remainder of the pre-form, and said one wall being at a formable temperature, the steps of, in the blow mold and while the pre-form remains inflated,
    1. contacting the exterior surface of said one convex pre-form wall with a plurality of independently axially movable, concentric sleeves surrounding a central rod which is also independently axially movable, said rod and said sleeves each having end faces provided with stepped, angularly related surfaces interrupted by radial grooves,
    2. moving said rod and said sleeves with the end faces thereof in contact with said convex wall and while retaining the remainder of said pre-form stationary, the rod being moved a greater distance than any of said sleeves and the outer of said sleeves being moved a lesser distance than the inner of said sleeves,
    3. the performance of step (2) deflecting the one convex wall to a concave configuration, reducing the amount of protuberance of said one wall from the remainder of the container, and forming an annular support ring having an interior surface communicating with the interior of the container, (4) the performance of step (2) while the pre-form remains inflated also forcing the exterior surface of the concave wall inwardly of said support ring against the end faces of said rod and said sleeves to form on said wall annular reinforcing ribs and additional radial ribs intersecting said annular ribs, and
    5. chilling the one wall in its deflected, concave configuration.

* * * * *